United States Patent
Pinedo et al.

(10) Patent No.: US 6,917,362 B2
(45) Date of Patent: Jul. 12, 2005

(54) SYSTEM AND METHOD FOR MANAGING CONTEXT DATA IN A SINGLE LOGICAL SCREEN GRAPHICS ENVIRONMENT

(75) Inventors: David Pinedo, Ft Collins, CO (US); Alan D Ward, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 10/056,695

(22) Filed: Jan. 25, 2002

(65) Prior Publication Data

US 2003/0142037 A1 Jul. 31, 2003

(51) Int. Cl.$^7$ ................................................. G06T 1/60
(52) U.S. Cl. ...................... 345/530; 345/1.1; 345/1.3; 345/4; 715/778; 715/781
(58) Field of Search ..................... 345/1.2, 1.3, 2.1, 345/2.2, 3.1, 4, 5, 503, 778, 629, 1.1, 733, 520, 903; 715/781, 783, 784, 788, 797, 799, 803, 804

(56) References Cited

U.S. PATENT DOCUMENTS

| | | | | |
|---|---|---|---|---|
| 5,748,189 A | * | 5/1998 | Trueblood | 345/755 |
| 5,923,307 A | * | 7/1999 | Hogle, IV | 345/4 |
| 6,088,005 A | | 7/2000 | Walls et al. | 345/4 |
| 6,147,695 A | * | 11/2000 | Bowen et al. | 345/503 |
| 6,215,486 B1 | | 4/2001 | Walls et al. | 345/329 |
| 6,249,294 B1 | | 6/2001 | Lefebvre et al. | 345/504 |
| 6,359,631 B2 | * | 3/2002 | DeLeeuw | 345/629 |

OTHER PUBLICATIONS

"Focus Plus Context Screens: Combining Display Technology with Visualization Techniques" Baudisch, Good and Stewart; Nov. 2001.
"A Distributed Graphics System for Large Tiled Displays" Humphreys and Hanrahan; 1999.

* cited by examiner

Primary Examiner—Matthew C. Bella
Assistant Examiner—Hau Nguyen (57) ABSTRACT

The present invention is generally directed to a system and method for managing context information in a graphics system having multiple displays configured as a single logical screen (SLS). In accordance with one embodiment a system is provided comprising a single device driver coupled to directly communicate with display hardware of at least two displays, a graphics API (application program interface) for communicating graphics information to the single device driver, a memory configured to store context information, the memory in communication with the single device driver, and a mechanism configured to direct context data from the memory to the display hardware of one of the displays.

13 Claims, 8 Drawing Sheets

SYSTEM AND METHOD FOR MANAGING CONTEXT DATA IN A SINGLE LOGICAL SCREEN GRAPHICS ENVIRONMENT

BACKGROUND OF THE INVENTION

1. Field of the Invention

The present invention generally relates to graphics systems, and more particularly to a novel system and method for managing graphics data in a single logical screen (SLS) graphics system.

2. Discussion of the Related Art

Computer graphics displays that have very large sizes and high resolutions are useful in a variety of applications. For example, such displays can be used to create immersive environments in which viewers are surrounded by the display. Such displays are also useful when large amounts of data must be viewable on one large screen, such as in stock market applications, large process control applications and the like. Frequently, in order to provide such a large display with adequately high resolution, a composite screen must be constructed using numerous separate physical display devices such as graphics hardware and CRT-type monitors. If the composite screen is to be used interactively, then suitable control mechanisms are also provided so that objects presented on the composite screen may be moved about and otherwise manipulated freely without regard to the fact that different portions of the objects are actually displayed on different physical display devices. In other words, the different physical display devices comprising the composite screen are controlled in concert so that they present the illusion of one large logical screen to the viewer. This kind of functionality has become known as "single logical screen" functionality, or simply "SLS." One solution for providing single logical screen functionality in an X-Window System environment is taught by Jeffrey J. Walls, Ian A. Elliott and John Marks in U.S. Pat. No. 6,088,005, issued Jul. 11, 2000, titled "A Design and Method for a Large, Physical Workspace" (hereinafter "Walls, et al."), which patent is hereby entirely incorporated by reference.

By way of background, the X-Window System is a standard for the implementation of network-based UNIX-Window systems. The X-Window System provides users and developers with the functionality for creating and managing a window environment in a network-based computer system.

The X-Window System Server (X-Server) is a multi-user device that controls the shared access to X-Window resources through a standard interface called Xlib. Each executing X-Server manages a single graphics display comprising a keyboard, a pointing device, such as a mouse, and one or more graphics hardware devices, each having one or more associated physical monitors. Physical monitors can differ in size, while graphics hardware devices differ in depth, and visual classes. The visual classes provide such information as: whether the graphics hardware supports color or grayscale, whether the set of displayable colors or shades of gray is fixed in hardware or can be changed, and if the monitor supports color, whether the intensities of red, green, blue primary colors are determined from a single lookup table or from individual tables, and the depth of the graphics hardware device which is the number of bits needed to represent a color.

The X-Server operates in two (2) multi-head configurations which are configurations comprising multiple physical monitors. The multi-head configurations are multi-seat and multi-screen. A multi-seat configuration comprises a graphics display dedicated to each user. Therefore, each user has a keyboard, mouse, one physical monitor, plus an X-Server to manage the graphics display. The graphics displays are completely independent of each other. A multi-screen configuration comprises a single graphics display connected to multiple physical monitors. Therefore, a user has a keyboard, mouse, multiple physical monitors, and one X-Server. A cursor on one physical monitor can be moved between the physical monitors. The X-Server, however, in some applications has been limited in that it cannot create, move, nor span windows across the physical monitors. In these applications, window borders were restricted to the size and location of the physical monitor on which they were created.

This problem was most prevalent in two-dimensional graphic systems requiring the display of large amounts of data that cannot be completely displayed on one physical monitor. Examples of such large data systems include: real estate, financial (such as the stock market), control room, large engineering processes, military mapping, and telecommunications. Each of these systems requires the output of large amounts of data which can easily exceed the display capacity of a single physical monitor. A user can only view these large data sets by panning and zooming. Multiple screens are needed to shuffle between the layers of individual windows.

A user of a multiple physical monitor system would greatly benefit if the X-Server managed the multiple physical monitors as a single logical screen in which windows, as well as the pointer, can cross physical monitor boundaries. Therefore, the user could manipulate the single logical screen just as if it were a single physical monitor. The user would have full screen capabilities across each of the individual physical monitors, thereby providing the full presentation of large amounts of data in a useful format.

The invention of Walls et al. solved the problem of managing multiple physical monitors as a single logical screen, SLS, by adding an SLS layer to the X-Server protocol, thereby creating an SLS X-Server. An SLS X-Server is generated when a server is initialized. Generally, at initialization, a user establishes the configuration of the SLS by defining the physical arrangement of the multiple physical monitors. The SLS X-Server then allocates SLS data structures and initializes the multiple physical monitors that comprise the SLS. One feature of Walls et al. was that the SLS layer provides a mechanism for translating a user's SLS window operation request to multiple physical monitors. Thus, a user possesses fill screen capabilities in an SLS environment, such as moving, spanning, and resizing windows, as well as moving the pointer, across physical monitor boundaries.

One issue in SLS systems relates to the implementation and handling of context data. As is known, unique sets of context data are generally associated with different processes or different windows. Although there may be multiple contexts for a given window, a single graphics context is limited to a single window. As is further known, the "active" context data for a given window is loaded into the graphics hardware, and includes information such as lighting information, transform matrices, color information, and other graphics state information. Once the context data is loaded into the graphics hardware, the hardware uses this data for processing primitives, before rendering the primitives to the display.

In situations where multiple context data sets are involved, and the context for a display or window changes, the current context data is saved from the graphics hardware to memory. Thereafter, the "new" context data is written from memory into the graphics hardware.

SUMMARY OF THE INVENTION

Accordingly, there is a desire for an efficient system and method for the handling of such context data.

To achieve certain advantages and novel features, the present invention is generally directed to a system and method for managing context information in a graphics system having multiple displays configured as a single logical screen (SLS). In accordance with one embodiment a system is provided comprising a single device driver coupled to directly communicate with display hardware of at least two displays, a graphics API (application program interface) for communicating graphics information to the single device driver, a memory configured to store context information, the memory in communication with the single device driver, and a mechanism configured to direct context data from the memory to the display hardware of one of the displays.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention above, reference will now be made in detail to a preferred embodiment of the present invention. In this regard, an embodiment addresses problems of managing multiple physical monitors as a single logical screen. More specifically, one embodiment provides an improved method and mechanism for managing context information in a SLS graphics system. Before describing the preferred embodiment, reference is first made briefly to FIGS. 1–3, which illustrate certain environmental components for a system and method of an embodiment of the invention.

Figure 1:
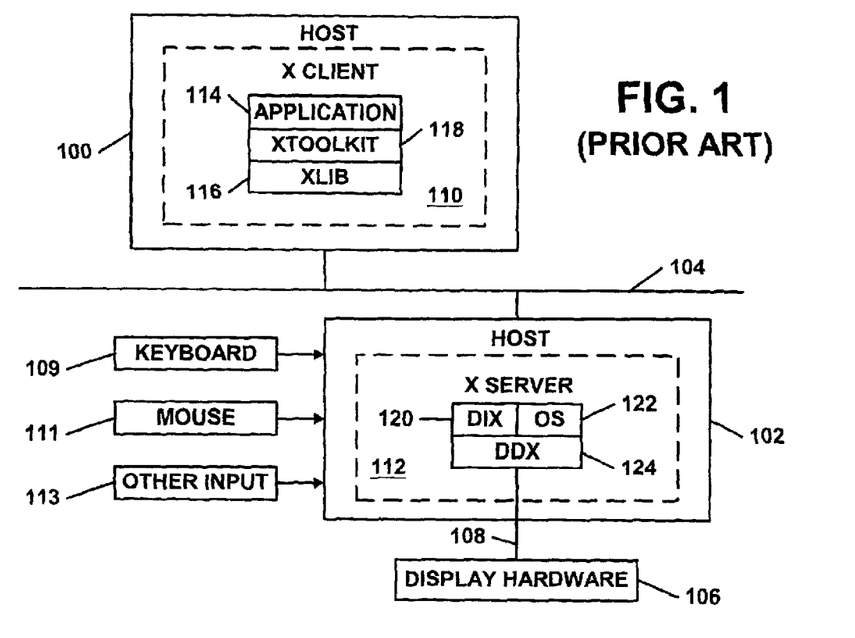
FIG. 1 is a diagram illustrating a single-screen networked X-Window System configuration according to the prior art.

FIG. 1 illustrates a conventional X-Window System configuration that does not implement single logical screen functionality. Host computer system 100 is coupled to host computer system 102 via connections to a local area network ("LAN") 104. Although a network 104 has been illustrated, it will be appreciated that the SLS system may be implemented independently of a network 104.

Host computer system 102 drives display hardware 106 via bus 108 and is capable of receiving input from devices such as a keyboard 109, a mouse 111 or other devices such as a button box 113. X client software 110 runs on host 100, while X-Server software 112 runs on host 102. Although configurations of client 110 may vary, a typical client would comprise an application 114 that communicates with server 112 by means of calls to low-level library Xlib 116. Optionally, Xlib 116 may be augmented by a higher-level library such as XToolkit 118. The purpose of X-Server 112 is to implement a user interface on display hardware 106 responsive to commands received from X client 110 and input devices 109, 111 and 113. A conventional X-Server 112 includes three basic components: a device independent X ("DIX") layer 120, an operating system ("OS") layer 122, and a device dependent X ("DDX") layer 124. DIX layer 120 contains the parts of the server software that are portable from one hardware/OS implementation to another. OS layer 122 implements server functions that vary with specific operating systems. DDX layer 124 implements server functions that depend on the capabilities of particular graphics hardware and input devices.

Figure 2:
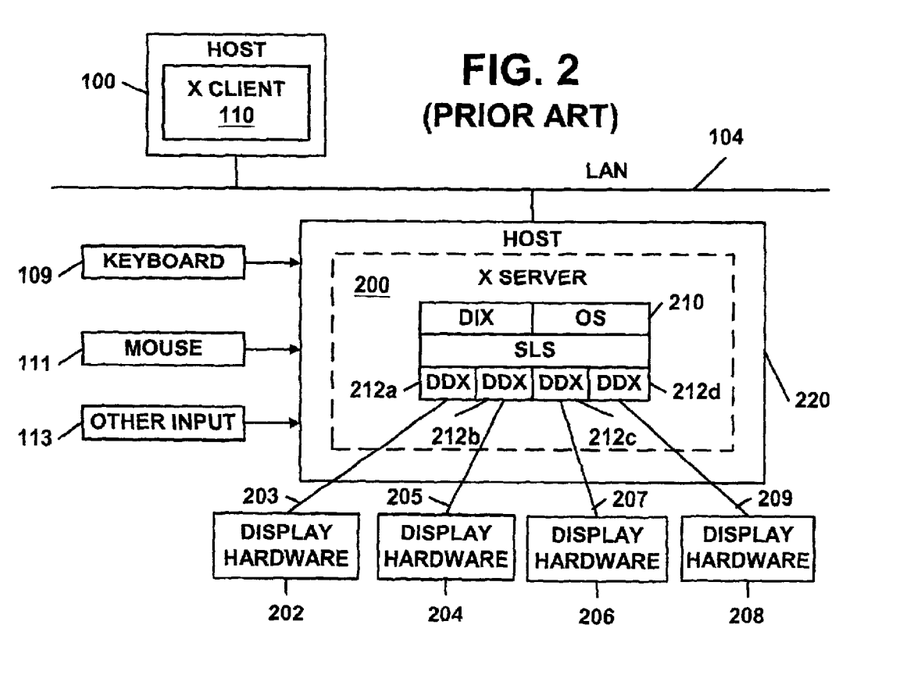
FIG. 2 is a diagram illustrating a single logical screen networked X-Window System configuration that uses one remote computer system according to the prior art.

FIG. 2 illustrates an X-Window System configuration that implements single logical screen functionality according to the teaching of Walls, et al. In the configuration of FIG. 2, augmented X-Server software 200 runs on host computer 220. X-Server 200 controls multiple display hardware devices 202, 204, 208 and 208 via buses 203, 205, 207 and 209. This capability is accomplished by the addition of a single-logical-screen ("SLS") layer 210 to X-Server 200, as well as a separate DDX layer 212a, 212b, 212c and 212d (sometimes referred to collectively as 212) for each of the display hardware devices. An advantage of the configuration of FIG. 2 is that single logical screen functionality is provided in a way that is transparent to X Client 110. In other words, the single logical screen functionality provided by X-Server 200 enables X Client 110 to function as though it were communicating with one large, high-resolution device. The overhead required to provide the high-resolution single logical screen functionality using several smaller-resolution devices is subsumed entirely within X-Server 200.

Figure 3:
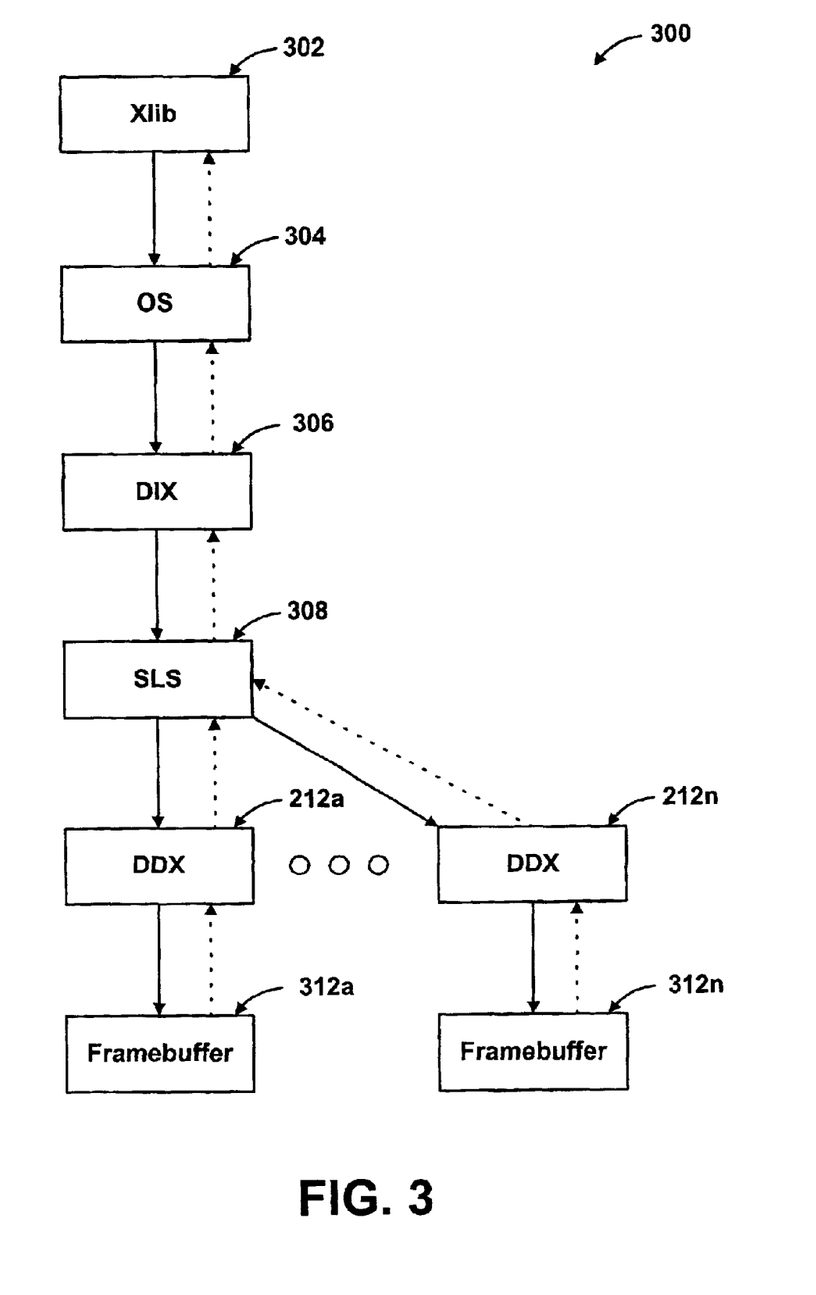
FIG. 3 is a block diagram illustrating the organization of an SLS X-Server.

FIG. 3 illustrates an SLS X-Server 200 and the interaction of an SLS layer 204 with the original parts of an X-Server (not shown). The SLS layer 204 is a liaison between the DIX 306 and DDX 212 layers. A difference between a X-Server and an SLS X-Server 200 in a multi-head configuration is readily apparent. An X-Server (see FIG. 1) is generally limited to one single DDX that manages either multi-seat or multi-screen configurations such that windows cannot be moved across the physical monitors. In contrast, the SLS X-Server 200 (see FIG. 2) manages multiple physical monitors, with multiple DDXs 212a–212n and Framebuffers 312a–312n, in which windows can move and span across the physical monitors. Each DDX 212a–212n and Framebuffer 312a–312n each corresponds to a specific graphics display of a physical monitor. For example, DDX 212a and Framebuffer 312a control the graphics operations of physical monitor 'a,' DDX 212b and Framebuffer 312b control the graphics operations of physical monitor 'b,' etc.

In operation, the SLS layer 308 is transparent to the user. Once the SLS X-Server 200 is initialized with the SLS configuration, a user creates and manipulates the SLS in a normal manner, such as using Xlib 302 functions directed to a single screen X-Server 112. The OS 304 reads the Xlib 302 request and sends the appropriate message to the DIX 306, thereby invoking a DIX 306 function, or request. The DIX 306, in turn, takes the request and executes the device independent parts of the request, if any. After which, the DIX 306 invokes a corresponding SLS layer 308 function, or request. The SLS layer 308 translates the SLS request into a low-level DDX 212a–212n function call for each physical monitor in the SLS configuration. That is, the SLS layer 308 loops through the number of physical monitors in the SLS configuration, 'a' through 'n,' and for each physical monitor, the SLS layer 308 invokes the corresponding DDX 212a–212n function. Therefore, each Xlib request for manipulating an SLS is translated to individual requests for each physical monitor in the SLS configuration. Each DDX 212a–212n function reads/writes data to the corresponding Framebuffer 312a–312n of each physical monitor.

The SLS layer 308 simply "plugs into" the X-Server 112 organization with no intrusive code in either the DIX 306 or DDX 212, thereby allowing the SLS layer 308 to be installed as a dynamically-loaded driver and, if necessary, port to other operating systems with minimal effort.

It will be appreciated that the brief discussion above of FIGS. 1 through 3 illustrates certain environmental features to facilitate an appreciation of the system and method of the preferred embodiment of the present invention. This "environment" and other system implementation details will be appreciated by persons skilled in the art, and need not be described further herein. Before describing the preferred embodiment, however, reference will first be made to FIGS. 4 and 5, which provide illustrations of systems that will facilitate an appreciation of the preferred embodiment.

Figure 4:
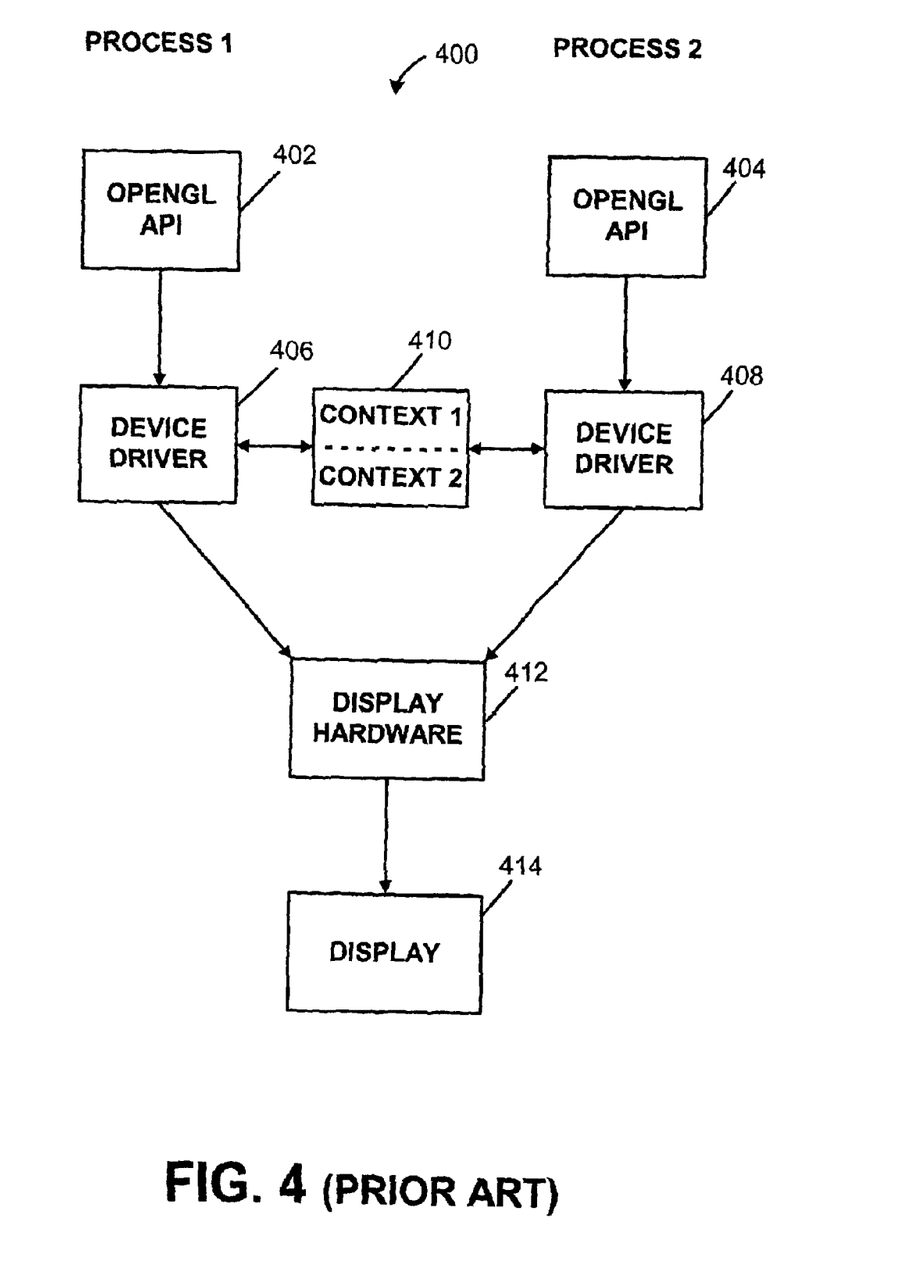
FIG. 4 is a block diagram illustrating certain components of a graphics system in a prior art single display graphic system

Referring first to FIG. 4, a block diagram is provided illustrating certain components of a graphics system 400. In this regard, certain blocks are illustrated to depict the handling of context information in a single display graphic system. As is known, context information essentially contains the "state" of the graphics for a given OpenGL context. Lighting parameters, transform matrices, and other information of this type comprise the context information for particular graphics OpenGL context. Generally, this information is contained within a series of registers within the display hardware 412.

In the embodiment illustrated in FIG. 4, two separate processes are operating to generate graphics data for driving a display 414. In the illustrated embodiment, both processes utilize an OpenGL API (application program interface) 402 and 404 (OpenGL is a registered trademark of Silicon Graphics, Inc.). As is known, the OpenGL API is a tool for developing portable, interactive 2D and 3D graphics applications. The OpenGL API provides a low-level, vendor-neutral software interface, that some have referred to as the "assembler language" of computer graphics. In addition to providing flexibility and functionality, OpenGL applications realize broad platform accessibility in the industry.

The graphics commands sent down from each OpenGL API 402 and 404 are processed by independent device drivers 406 and 408. As is known, such a device driver is configured to take such information and "drive" the display hardware 412 (which includes components such as geometry accelerators, rasterizers, frame buffers, etc.). As is also known, only one of the device drivers 406 and 408 may drive the display hardware 412 at any given time. Task switching may be implemented to task switch between the various processes that are driving the display 414. These types of operations and their implementation are well known, and need not be described herein.

As is also known, FIG. 4 illustrates a typical DHA (direct hardware access) environment, in which a graphics API may write directly to the graphics hardware (as opposed to interfacing the graphics hardware through intermediate processes, such as an SLS Daemon).

Systems, such as that illustrated in FIG. 4, have been known to provide context information in a shared memory 410. This memory is termed a shared memory insofar as the context information may be accessed by either device driver 406 or 408. The illustrated embodiment illustrates the implementation of the system having two separate and distinct contexts for switching between, within the display hardware 412. Simply stated, when context 1 is active, the context 1 information is loaded into the appropriate register base of the display hardware 412. As one of the device drivers requires the switching of the display hardware 412 to the second context, then the relevant context registers of the display hardware 412 are written back to shared memory 410, and the information from context 2 is written from the shared memory 410 into the display hardware 412. Of course, additional processes maybe implemented in a similar system configuration. Likewise, additional graphics contexts may be implemented. However, for simplicity and illustration purposes, FIG. 4 has illustrated only two such processes having two separate contexts.

Figure 5:
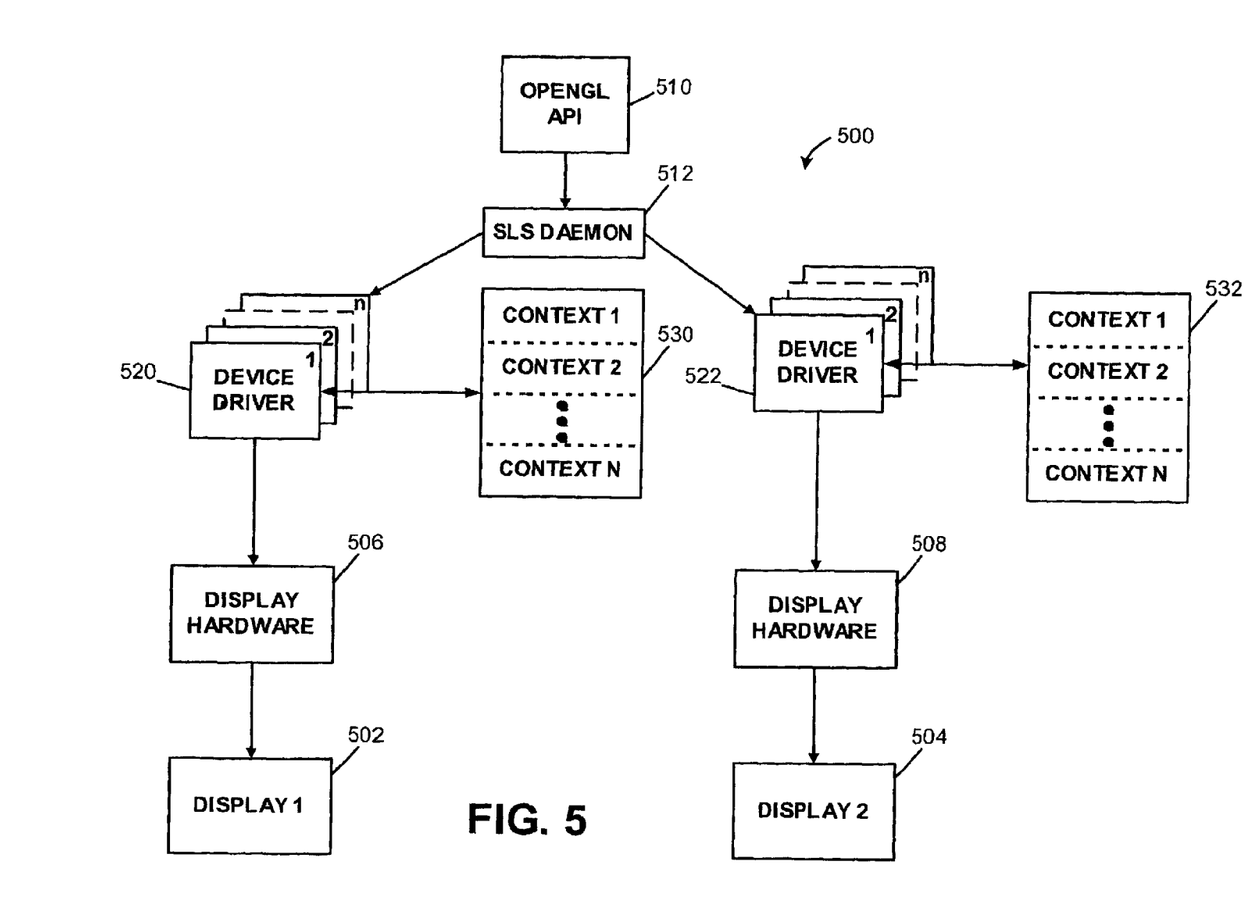
FIG. 5 is a block diagram illustrating certain components of a graphics system that manage context information in a single display graphic system.

Reference is now made to FIG. 5, which is a block diagram of a system 500 illustrating an alternative implementation for managing context information in a graphic system. More particularly, the system illustrated in FIG. 5 is an SLS system having two displays 502 and 504. Of course, additional displays may be implemented and combined to effectively render a single logical display. Display hardware 506 and 508 are coupled to each of the displays 502 and 504, respectively. As mentioned above, the hardware components within the display hardware 506 and 508, as is known by persons skilled in the art, may take on a variety of different forms or implementations consistent with the invention, and therefore need not be described herein.

In the embodiment of FIG. 5, a single graphics process using an OpenGL API 510 provides the graphics commands for driving the various displays 502 and 504. The generation of such graphics commands may be provided under application or programmer control, and need not be described herein.

An SLS Daemon 512, the operation of which is described in Walls et al., receives the graphics commands and data from the API 510, and partitions them for direction to the various displays of the SLS system. In this regard, data is sent from the SLS Daemon 512 to each of the device drivers 520 and 522 that are coupled to the individual displays 502 and 504. For simplicity, only two displays have been illustrated in FIG. 5, but it will be appreciated that additional displays may be added. Of course, as additional displays are added, additional device drivers will be added as well.

FIG. 5 also illustrates a plurality of graphics contexts (context 1, 2, ... n). This context data is stored in memories 530 and 532. It should be appreciated that, in another embodiment, these memories may be combined into a single, shared memory, as the context data is the same in both memories (i.e., context 1 is the same in memory 530 as context 1 in memory 532).

As is also illustrated, there are a plurality of device drivers associated with each display 502 and 504. In this regard, the number of instances of the device driver (e.g., device driver 520-1, 520-2, . . . 520-n) is equal to the number of contexts that are stored in the memory 530. As the graphics hardware 506 and display 502 are controlled to switch from one context to another, the context information currently existing in the display hardware 506 is saved to memory 530, and the next context (i.e., the context that the display hardware 506 is to be switched to) is written from memory 530 into the display hardware 506. Similar transactions for the context information occur between memory 532 and display hardware 508 for context switching associated with display hardware 508 and display 504.

Figure 6:
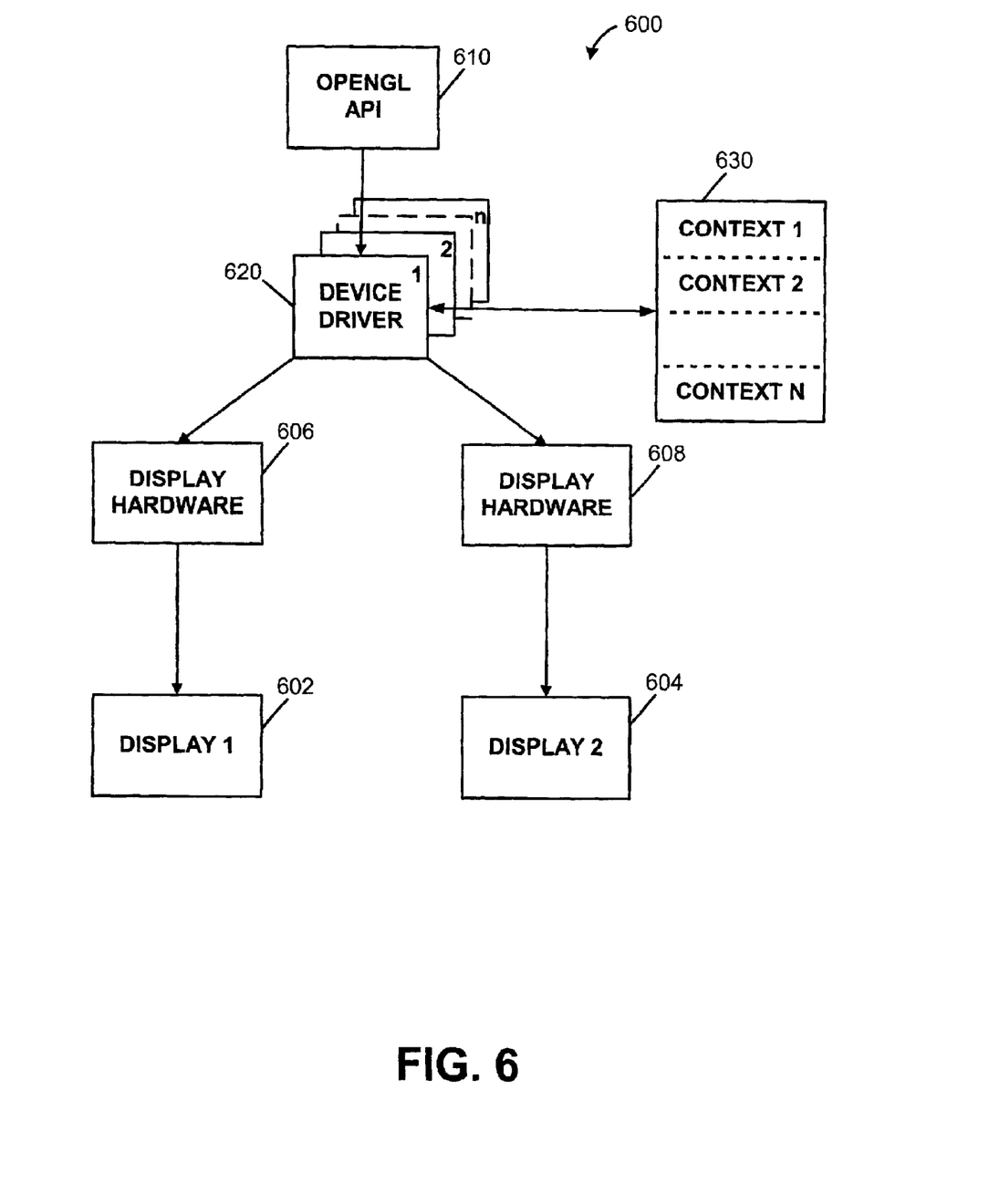
FIG. 6 is a block diagram illustrating certain components of a graphics system that manage context information in a dual display graphic system, in accordance with one embodiment of the present invention.

Reference is now made to FIG. 6 which is a block diagram illustrating certain components of a system 600 constructed in accordance with a preferred embodiment. In many respects, the embodiment of FIG. 6 is similar to the embodiment illustrated in FIG. 5. For example, the system 600 is a SLS display system having a plurality of displays 602 and 604. For simplicity, only two displays have been illustrated. Like the system of FIG. 5, the system 600 includes display hardware 606 and 608 associated with each display 602 and 604, respectively. At least one significant difference between the system of FIG. 6 and that illustrated in FIG. 5 is the implementation of the system using only a single device driver 620 to manage multiple displays and their hardware. Indeed, this is one novel aspect of the preferred embodiment. The system 600 further comprises a memory 634 storing context information that is not currently being utilized by the display hardware 606 or 608. Like the system illustrated in FIG. 5, the system of FIG. 6 illustrates a plurality of contexts (context 1, 2, . . . n) with a corresponding plurality of instances (device driver 1, 2, . . . n) of the device driver 620. In this regard, each context is associated with a dedicated device driver 620 that in turn drives the display hardware of a plurality of displays.

The preferred embodiment realizes performance and efficiency advantages over prior systems in certain operational scenarios. In this regard, it is understood that a device driver 620 is operational at any given time to drive the display hardware of only a single display. Therefore, as a window (visible to a user) is split or shared among two or more displays, not all of the window information will be updated through the system of the preferred embodiment. Instead, the preferred embodiment is designed to associate the device driver 620 with the display hardware 606 or 608 that is associated with the display that contains the majority of a window (associated with the given context information). As a user or other controlling entity causes the window to move or be resized such that a majority of the window shifts from a first display to a second display, then the preferred embodiment swaps the context information and begins rendering to the appropriate display hardware.

Figure 7A:
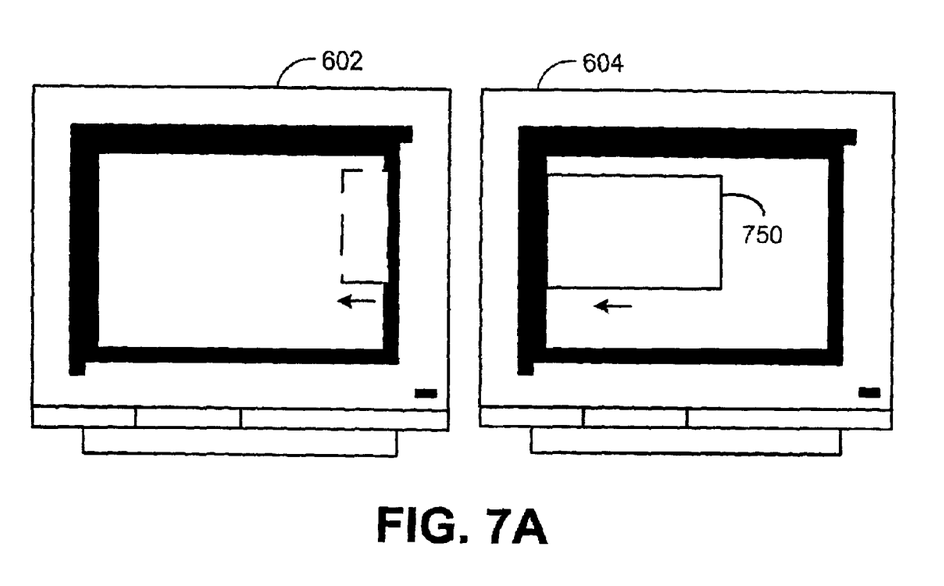
FIGS. 7A and 7B illustrate the movement of a graphics window from one display to a second display.
Figure 7B:
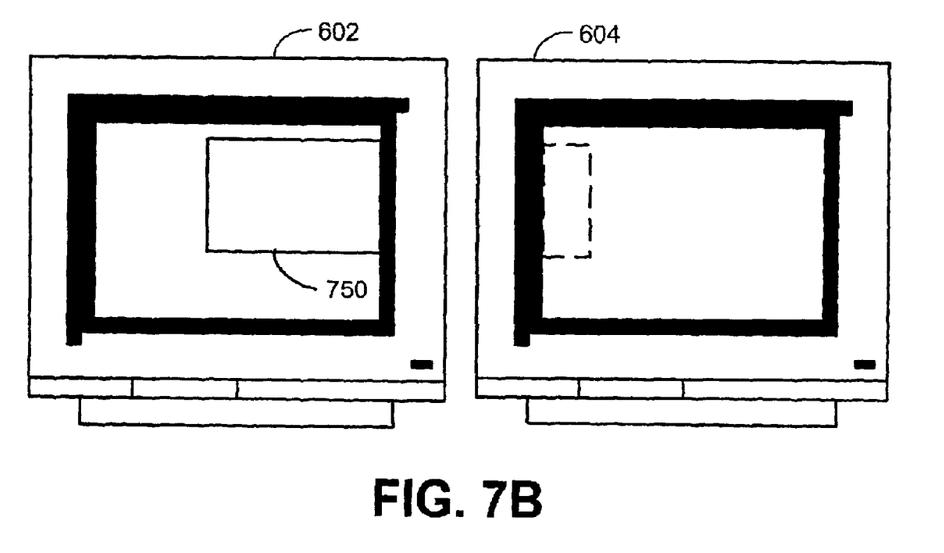

To illustrate this concept, reference is made briefly to FIGS. 7A and 7B, which illustrate the movement of a window 750 in a direction from display 604 to display 602. As illustrated in FIG. 7A, the majority of the window 750 occupies display 604, while only a minority portion of the window 750, illustrated in dash lines in display 602, occupies a portion of the display 602. Assume further, for purposes of this example, that context 2 is the controlling context state for the window 750. When the window is positioned as illustrated in FIG. 7A, the device driver 620 ensures that context 2 information is active within the display hardware 608 (which controls display 604). As a user, or other controlling entity, moves the window 750 in the direction of display 602, at some point the majority of the window 750 occupies display 602 (as shown in FIG. 7B). As soon as the majority of the window 750 moves from display 604 to display 602, the device driver 620 operates to direct context 2 information into the display hardware 606 associated with the display 602. Thereafter, the device driver 620 no longer controls the display of that portion of the window 750 residing in display 604. One option would simply be to allow the display to go black in that area. Another option may be to allow the display hardware 608 to fill that area with the background color of the window 750. Yet another option may simply be to implement no control over the information that is displayed in that portion of the display 604.

While it may be recognized that an implementation of this type may result in an esthetically unpleasing presentation, or undesired visual results, it provides a much simplified and streamlined hardware implementation and methodology. Furthermore, it has been recognized that, in most applications, users do not control the display of a window to span multiple displays. Instead, users typically isolate different windows onto different displays such that the potential adverse visual effects are simply not present in most practical applications. Therefore, the architecture of the preferred embodiment provides a desirable alternative for most practical implementations.

Figure 8:
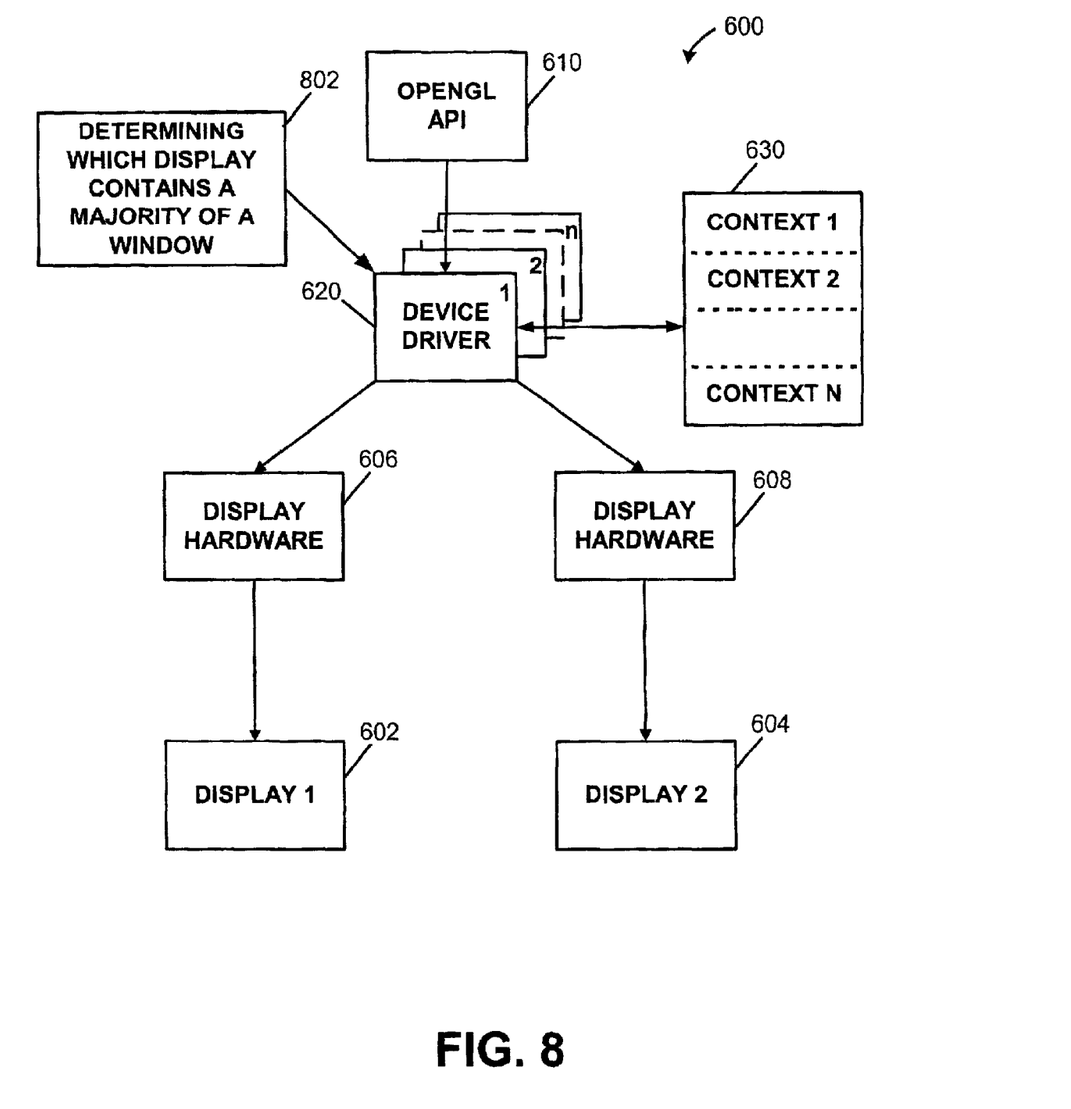
FIG. 8 is a block diagram similar to FIG. 6, but further illustrating a mechanism for determining which display contains a majority of a graphics window.

Having discussed the foregoing, it will be appreciated that another component of the present invention comprises a mechanism for determining which display (among a plurality of displays) contains a majority of a window. Reference is made briefly to FIG. 8, which illustrates such a mechanism 802 as being in communication with the device driver 620. It will be appreciated that the implementation of such a mechanism may take on various forms, consistent with the present invention. In one embodiment, the mechanism 802 may be implemented within the X-Server. In an alternative embodiment, the mechanism may be implemented in the device driver. And yet another embodiment, the mechanism may be implemented separate from the device driver. Thus, it is preferred that the device driver 620 does the work to switch from one device to another when the display is changed.

Figure 9:
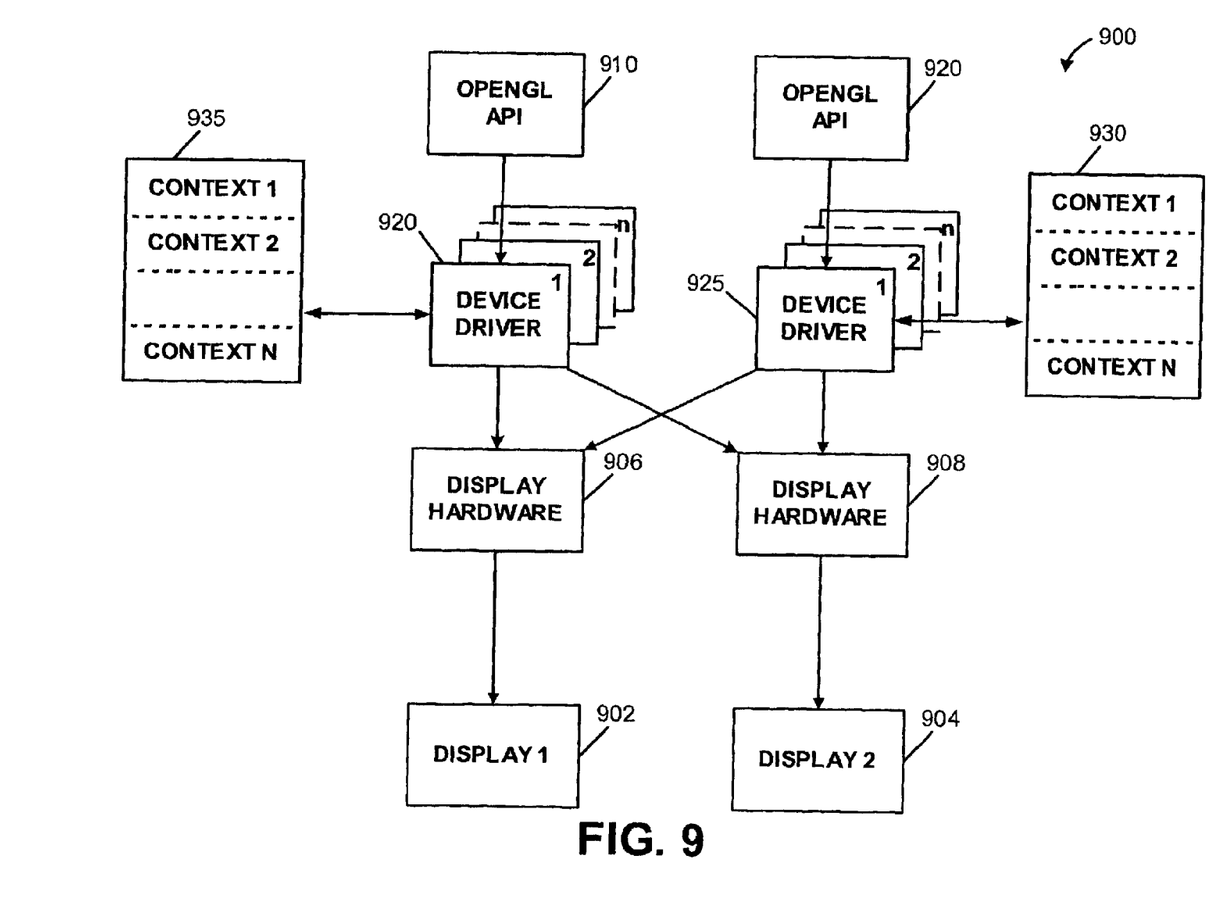
FIG. 9 is a block diagram illustrating an embodiment that supports the display of multiple windows on a single logical screen.

Reference is now made to FIG. 9, which illustrates another embodiment, similar to the embodiment illustrated in FIG. 6. The embodiment of FIG. 9, however, illustrates the notion that multiple processes, using multiple APIs 910 and 920, may direct graphics information and commands to multiple device drivers 920 and 925 that are associated with the multiple displays 902 and 904 (and the associated display hardware 906 and 908, respectively). In this regard, multiple windows (or multiple contexts) may be displayed on a single display. Therefore, the API 910 may be controlling the display of a first window presented on the display 902, while API 900 may be controlling the display of a second window on the same display 902.

The diagram of FIG. 9 illustrates that the broader concept of the preferred embodiment (i.e., using a single device driver to manage context information among multiple displays) may be readily extended to the display of multiple windows.

It will be appreciated that one embodiment provides a greatly simplified system and method for managing context data in a SLS system. In this regard, a significant simplification relates to the implementation of DHA in an SLS environment, using only a single device driver.

What is claimed is:

1. A system for managing context information in a graphics system having multiple displays configured as a single logical screen (SLS) comprising:

a single device driver coupled to directly communicate with display hardware of at least two displays;

a graphics API (application program interface) for communicating graphics information to the single device driver;

a memory configured to store context information, the memory in communication with the single device driver; and a mechanism configured to direct context data from the memory to the display hardware of only one of the displays, while a window is displayed across the two displays, with a portion of the window being displayed in each of the two displays.

2. The system of claim 1, further comprising a mechanism configured to determine which one of the, multiple displays that a majority of the window occupies.

3. The system of claim 2, wherein the mechanism configured to direct context data operates in response to the mechanism configured to determine which one of the multiple displays the majority of the window occupies, such that context data is directed from the memory to the display containing the majority of the window.

4. The system of claim 1, wherein the mechanism configured to direct context data is disposed with an X-Server.

5. The system of claim 1, wherein the mechanism configured to direct context data is disposed with a device driver for display hardware.

6. The system of claim 1, wherein the graphics API is OpenGL.

7. The system of claim 1, wherein there is a single device driver per context.

8. The system of claim 1, further comprising an X-Server and a user interface to allow a user to controllably move and size windows on the SLS.

9. In a graphics system having multiple displays configured as a single logical screen (SLS), a method for managing context information comprising:

determining which one of the multiple displays that a majority of a window occupies;

directing context information from a memory into display hardware associated with only the display that a majority of the window occupies, while a minority portion of the window is disniaved in at least one other display.

10. The method of claim 9, wherein the step of directing context information from the memory into display hardware associated with the display that a majority of the window occupies, further comprises not communicating the context information to display hardware associated with other displays.

11. The method of claim 9, wherein the step of determining which one of the multiple displays that a majority of the window occupies is performed by an X-Server.

12. The method of claim 9, wherein the step of determining which one of the multiple displays that a majority of the window occupies is performed by a device driver for display hardware.

13. The system of claim 3, wherein the mechanism configured to direct context data operates such that context data is directed from the memory to the only display containing the majority of the window, when the window spans more than one display.

* * * * *